July 21, 1942.  J. G. WINSOR  2,290,221
VEHICLE FOR TRANSPORTING BULK GRANULAR MATERIAL
Filed Sept. 30, 1940  2 Sheets-Sheet 1
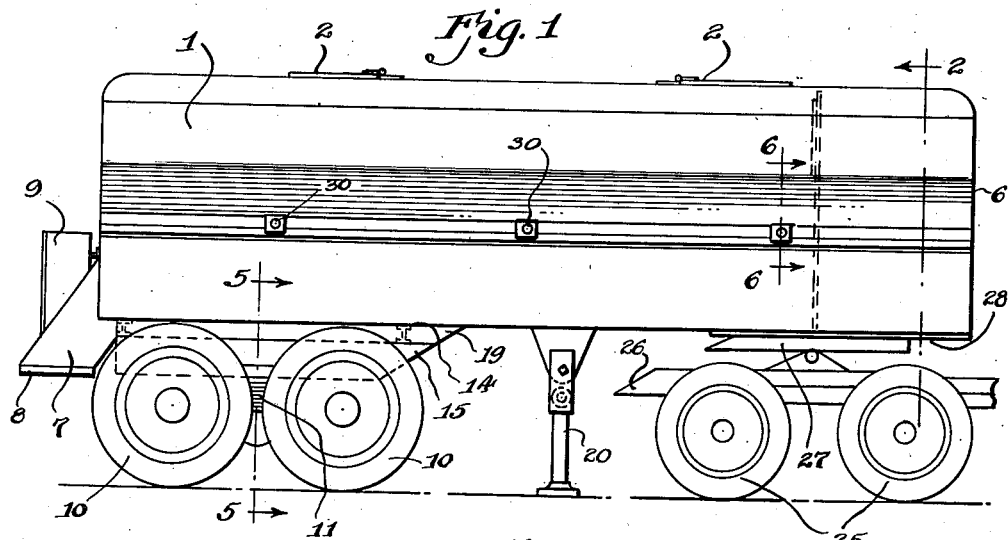
Fig. 1
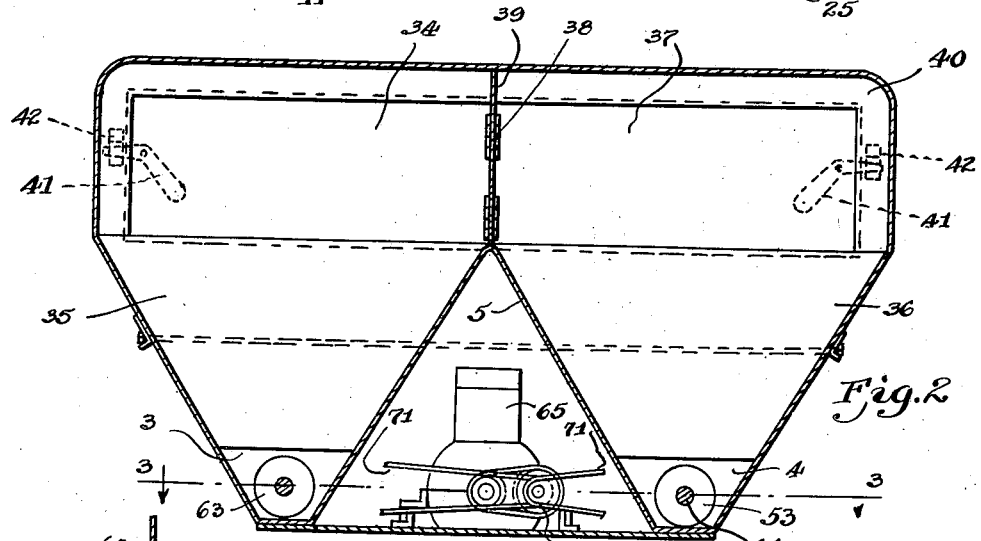
Fig. 2
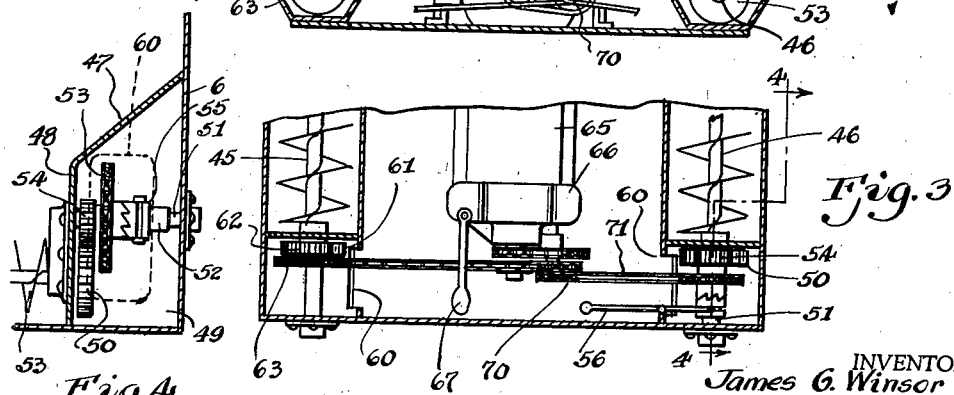
Fig. 3
Fig. 4
INVENTOR.
James G. Winsor
BY
Barnes, Kisselle, Laughlin & Raisch
ATTORNEYS

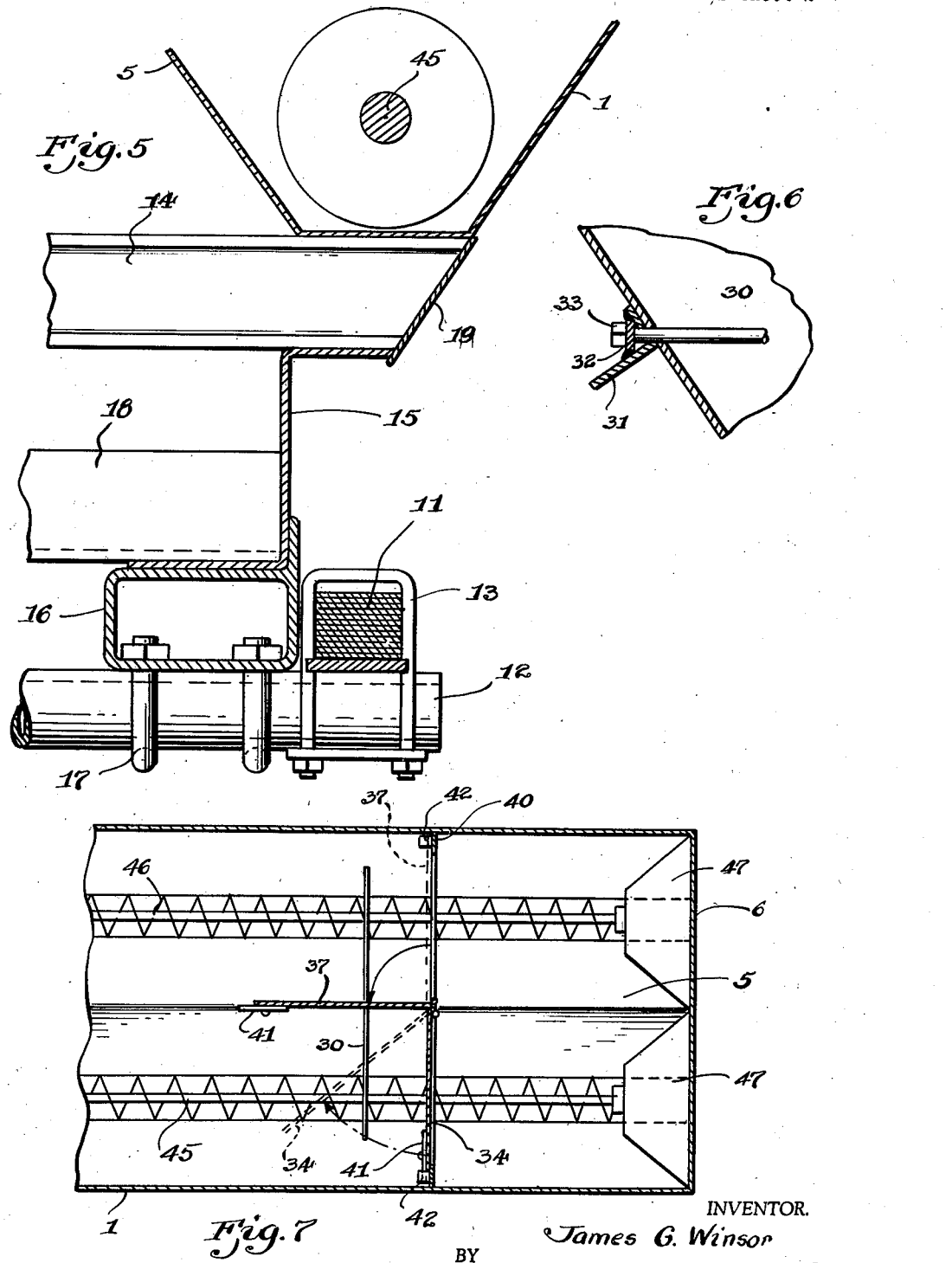

Patented July 21, 1942

2,290,221

UNITED STATES PATENT OFFICE 2,290,221

VEHICLE FOR TRANSPORTING BULK GRANULAR MATERIAL

James G. Winsor, Detroit, Mich.

Application September 30, 1940, Serial No. 359,019

10 Claims. (Cl. 280—5)

This invention relates to a tank vehicle, and it has to do especially with a vehicle of tank form for conveying granular or powder-like material such as cement, sodium chloride, or other bulk granular substance.

Among the objects of the invention is the provision of a body of tank form for holding bulk granular material and which is of a construction that it has strength for carrying the load and for resisting draft and torsional strains, to the end that the tanklike body may be mounted directly upon ground-engaging wheels without the use of a separate frame. This reduces the weight of the vehicle and thus permits carrying a heavier pay load. Various States and localities have maximum load limitations per axle on highway vehicles, and it is obvious that if the gross weight must be within a prescribed maximum the pay load weight can be greater if the vehicle weight is reduced.

The invention also has an object the provision of a tank-like vehicle so arranged that the weight placed upon certain of the wheels can be varied. In the so-called semi-trailer, for example, where the forward end of the tank-like body rests upon a tractor, with weight carried by the tractor wheels, a given load may be permissible with the tractor having tandem axles, but the same load would be too heavy and exceed the requirements with a tractor having but a single axle. Yet semi-trailers of this type are used with different tractors, some of which may have tandem axles, and others but a single axle. In accordance with this invention, an arrangement is provided which, in effect, provides a bulk head within the tank body, by means of which the capacity may be varied. Such a semi-trailer may thus be used optionally with trucks having single and double axles, with the bulk head reducing the capacity when the semi-trailer is used with a single axle truck. The invention also has, among other objects, the object of providing a novel construction wherein the driving mechanism for discharge mechanism is all within the confines of the vehicle body. These and other objects will be better appreciated as the following description is considered in connection with the accompanying drawings.

Fig. 1 is a side elevational view of a vehicle constructed in accordance with the invention and showing a so-called semi-trailer with its forward end resting upon a tractor.

Fig. 2 is an enlarged cross sectional view taken substantially on line 2—2 of Fig. 1 showing, however, the engine and its driving mechanisms in elevation.

Fig. 3 is a detail view largely in section taken substantially on line 3—3 of Fig. 2.

Fig. 4 is a detail view taken substantially on line 4—4 of Fig. 3 showing a controlling clutch.

Fig. 5 is an enlarged detail view taken substantially on line 5—5 of Fig. 1 showing the mounting of the tank vehicle on its running gear.

Fig. 6 is a detail view of a tank construction taken substantially on line 6—6 of Fig. 1.

Fig. 7 is a detail view largely in section showing the bulk head construction.

In Fig. 1 a vehicle of the semi-trailer type is shown having a tank-like body 1 with closures 2 in the top for covering openings, by means of which the tank body is filled with material to be transported. As shown in Fig. 2 the tank is of such a formation. One trough formation is illustrated at 3 and the other at 4, while an inverted V-shaped tunnel formation 5 divides the troughs and runs the length of the tank body. The tunnel formation is secured to the end walls of the tank, and as shown in Fig. 7 the tunnel formation 5 butts against the forward wall 6 and may be welded thereto. At the rear of the vehicle the tunnel 5 is connected to the rear wall. The two troughs 3 and 4 open into a common outlet chute 7 which may be closed by a closure piece 8 operable by suitable mechanism in a container box 9.

The trough formation gives the tank body a backbone, so to speak, so that the tank body is of such strength that it can be mounted on running gear without the use of an intervening frame. The tank is of sheet metal construction with the sheets united, preferably by welding, to give a strong self-supporting body. As shown in Fig. 1 the vehicle has at its rear end tandem ground-engaging wheels 10, the axles of which are suitably connected to the ends of a spring 11. The central portion of the springs are mounted upon a cross shaft or stub axle 12 as by means of clamps 13 as shown in Fig. 5. The body may rest directly upon transversely extending supports 14 advantageously in the form of I beams, as shown in Fig. 1. At each side of the vehicle a load supporting member which may be a Z-shaped piece of iron, as shown at 15, is disposed between the I beams and the transverse shaft 12. A suitable bracket 16 may be secured to the shaft 12 as by means of clamps 17 and which directly support the Z irons 15. One or more transverse supports 18 may connect the Z irons. A side plate 19 may be used to close the opening at the ends of the I beams. The several parts, as shown in Fig. 5, except for those parts held by the clamps 13 and 17, may all be welded together.

The semi-trailer has supporting legs 20 which may be used to support the job when it is detached from a tractor. The wheels of a tractor are illustrated at 25 while the frame is at 26, and the tractor carries a fifth wheel member 27 upon which the forward end of the trailer is mounted as by means of a cooperating plate or fifth wheel 28. It will be understood by those versed in the art that the legs 20 are lifted out of position when the semi-trailer is in running condition on the tractor.

As a further support for the tank body, a plurality of cross rods 30 may be used which extend transversely through the tank. Along each side of the tank is welded an angle iron 31, while filler blocks 32 are welded in position to underlie the nuts 33.

Near the forward end of the vehicle is a bulk head construction which, as shown in Fig. 2, comprises two permanent plates 35 and 36 which substantially close the two troughs but which terminate short of the bottom thereof for reasons which will presently appear. In the portion of the tank above the troughs are two bulk head doors 34 and 37 hinged as at 38 on a center support 39. The doors, when closed, are adapted to abut the upper edges of the plates 35 and 36 and an interior jamb 40. Each door may be equipped with a pivoted latch 41 adapted to engage a keeper 42.

In the lower portion of each trough is a screw conveyor for propelling the granular material rearward for discharge purposes, causing the same to flow out through the discharge chute 7. These screws are shown at 45 and 46. As shown in Fig. 4 each trough, at its lower forward end, is closed by a partition having an upper wall 47 and a vertical wall 48, which thus forms a compartment 49 at the lower forward end of each trough, but within the forward wall 6 of the tank. Each screw is journaled in the wall portion 48 as shown in Fig. 4, and each has a gear 50 located in the compartment 49. The driving arrangement for the screw 46, as shown in Fig. 4, includes a rod 51 extending through the compartment 49 over which is a sleeve 52, and journaled on the sleeve is a sprocket 53. Mounted in driving relationship on the sleeve 52 is a gear 54, the teeth of which mesh with gear 50 and a clutch member 55, also in driving relationship with the sleeve 52, but slidable thereon. The clutch member 55 and sprocket 53 have interengaging teeth as shown in Fig. 4 and the member 55 may be shifted into and out of engagement by a control handle 56. The inner wall of each compartment is open as shown at 60. The driving arrangement for the screw 45 is similar in that the screw 45 has a gear 61, but the mating pinion 62 and sprocket 63 are disposed in permanent driving relationship.

Mounted in the space underneath the tunnel 5 is a driving motor 65 having the usual housing 66 for a clutch and reduction gear and a control lever 67 for engaging and disengaging the clutch, while the engine shaft 67 has two sprockets 70 for operating chains 71 running respectively over the sprockets 53 and 63. It will accordingly be seen that when the engine 65 is operating, screw 45 may be driven alone while the clutch 55 is open. Accordingly, after much of the contents in the tank is discharged the clutch 55 may be closed by its control lever 56 to thus drive the screw 46. On the other hand, both screws may be rotated at one time. In any event, however, first one screw and then the other may be coupled to the engine so that the engine does not have to overcome the torque of both screws in initial starting.

As shown in Figs. 1 and 3, the engine 65 and the driving mechanism for the screws are all located within the confines of the body of the vehicle, or in other words, rearward of the front wall 6. The engine is accessible at the open forward end of the tunnel 5 and this open end may be closed if desired by a suitable door or plate while access to the compartments 49 may be had through the openings 60 which are large enough to pass the gears and sprockets through for assembly and disassembly.

When the vehicle is to be used with a tractor having tandem axles, as shown in Fig. 1, and where a maximum pay load can be carried, the bulk head doors 36 and 37 are opened as indicated in Fig. 7. In this case the doors may be locked in back to back relationship along the center of the body. When the granular material is loaded into the tank through the openings in the top, the entire body is filled. In discharging the contents, however, the screws pass the material in the forward end of the body under the fixed plates 35 and 36. Now if the vehicle is to be used with a tractor having only a single axle underlying the front end of the body, the bulk head doors 36 and 37 may be closed as shown in Fig. 2. The position of the bulk head is illustrated in dotted lines in Fig. 1, with the result that the entire forward end of the tank is not loaded. Some of the granular material may sift through under the bulk head plates 35 and 36, but the level of the material which will sift therethrough will not be materially elevated in the forward compartment.

A tank type vehicle embodying this tank structure may be in the form of the semi-trailer shown, or it may be a so-called four-wheel trailer where it has permanent wheels at each end. Where a full trailer is thus provided, the bulk head may be dispensed with except where it is necessary to vary the axle load to meet local requirements. The body may be mounted on a single axle or tandem axles, thus forming a four-wheel trailer, a six-wheel trailer, or an eight-wheel trailer to obtain a maximum load under various State laws.

I claim:

1. In a vehicle for transporting granular material, a tank-like body of sheet metal construction having a top wall, end walls and side walls, the bottom of the tank comprising a single thickness of sheet metal having a substantially centrally disposed tunnel formation forming an exterior concavity extending from end to end and connecting to the end walls and forming the sole understructure of the tank-like body, the side walls converging downwardly from a point below the top wall, the tunnel formation and the converging portions of the side walls forming two interior troughs in the lower portion of the tank and extending from end to end thereof, said troughs being relatively narrow in their lower portion and widening upwardly, the sheet metal of the walls and the bottom, including the tunnel formation, being united to form a substantially rigid self-supporting structure, and the tunnel formation constituting an integral reenforcing member, and running gear secured directly to the tank.

2. In a vehicle for transporting granular material, a tank-like body of sheet metal construction having a top wall, end walls and side walls, the bottom of the tank comprising a single thickness of sheet metal having a substantially centrally disposed tunnel formation forming an exterior concavity extending from end to end and connecting to the end walls and forming the sole understructure of the tank-like body, the side walls converging downwardly from a point below the top wall, the tunnel formation and the converging portions of the side walls forming two interior troughs in the lower portion of the tank and extending from end to end thereof, said troughs being relatively narrow in their lower portion and widening upwardly, the sheet metal of the walls and the bottom, including the tunnel formation, being united to form a substantially rigid self-supporting structure, and the tunnel formation constituting a reenforcing backbone for the body, the top of the tunnel formation being in proximity to a horizontal plane at the top of the downwardly converging portions of the side walls, and running gear secured directly to the tank.

3. In a semi-trailer for transporating granular material and adapted for use with tractors having single and tandem axles comprising, a tank-like body having running gear on its rear end and a fifth wheel construction at its forward end adapted to rest upon a tractor, a bulk head structure in the tank body adjacent the forward end and including doors arranged to close off a compartment at the forward end of the body for use with a tractor with a single axle with the material carried in the remaining part of the tank and arranged to open the forward compartment so that the same may be filled with material for use with a tractor having tandem axles.

4. In a semi-trailer, for transporting granular material, a tank-like body having running gear at its rear end and a fifth wheel construction at its forward end adapted to rest upon the tractor, said tank-like body having a tunnel formation substantially centrally disposed and extending from end to end forming troughs in its lower portion, the tank body having a single compartment above the troughs, a bulk head construction arranged to close off a compartment in the forward end of the body and comprising fixed bulk head plates in the troughs, and bulk head door means in the space above the troughs arranged to be opened and closed whereby the compartment may be closed when the semi-trailer is used with a tractor with a single axle and opened for use with a tractor with tandem axles.

5. In a semi-trailer, for transporting granular material, a tank-like body having running gear at its rear end and a fifth wheel construction at its forward end adapted to rest upon the tractor, said tank-like body having a tunnel formation substantially centrally disposed and extending from end to end forming troughs in its lower portion, the tank body having a single compartment above the troughs, a bulk head construction arranged to close off a compartment in the forward end of the body and comprising fixed bulk head plates in the troughs, bulk head door means in the space above the troughs arranged to be opened and closed whereby the compartment may be closed when the semi-trailer is used with a tractor with a single axle and opened for use with a tractor with tandem axles, and screw means in the bottom of each trough for discharging the granular material, said fixed bulk head plates having their lower edges disposed clear of the screw means.

6. In a semi-trailer for transporting granular material and adapted for use with tractors having single and tandem axles, a tank-like body having running gear at its rear end and a fifth wheel construction at its forward end for resting upon a tractor, said tank-like body having having two trough formations in its lower portion and a single compartment above the troughs, a bulk head construction within the tank body disposed rearwardly from the front wall thereof and comprising fixed bulk head plates in the troughs, screw means in each trough for discharging the granular material, the bulk head plates being arranged to clear the screw means, jamb means above the bulk head plates and substantially aligned therewith, and bulk head door means arranged to be closed against the jamb means to complete the bulk head construction.

7. In a semi-trailer for transporting granular material and adapted for use with tractors having single and tandem axles, a tank-like body having running gear at its rear end and a fifth wheel construction at its forward end for resting upon a tractor, said tank-like body having two trough formations in its lower portion and a single compartment above the troughs, a bulk head construction within the tank body disposed rearwardly from the front wall thereof and comprising fixed bulk head plates in the troughs, screw means in each trough for discharging the granular material, the bulk head plates being arranged to clear the screw means, jamb means above the bulk head plates and substantially aligned therewith, and a pair of bulk head doors pivotally mounted substantially centrally of the tank and arranged to be opened and closed for use and non-use of the said forward compartment as the vehicle is used with a tractor having tandem axles and a single axle.

8. In a vehicle for transporting granular material, a tank-like body having a tunnel formation extending lengthwise from end to end and substantially centrally disposed, said tunnel formation dividing the lower portion of the tank into troughs, outlet means extending from the troughs, a screw in the bottom of each trough for discharging the granular material, said tank having a front wall, partition means at the forward end and in the lower part of each trough defining a compartment between the partition means and the front wall of the tank, said compartments having an opening leading to the tunnel formation, an engine mounted in the tunnel formation adjacent the front end of the tank and rearwardly of its front wall, and driving means extending from the engine into the compartments for driving the screws.

9. In a vehicle for transporting granular material, a tank-like body having front and rear walls, a tunnel formation extending lengthwise of the body and substantially centrally thereof and dividing the body into troughs, outlet means for the troughs adjacent the rear end, partition means at the forward end and in the lower portion of each trough defining a compartment between the partition means and the front wall of the tank, said compartments having openings leading to the tunnel, a screw in each trough for discharging the granular material, driving means for the screws located in the two compartments, an engine mounted in the tunnel formation rearwardly of the front wall of the tank and power transmitting means extending from the engine to the driving means in the compartments.

10. In a vehicle for transporting granular material, a tank-like body adapted to be supported by ground-engaging wheels at opposite ends, said tank-like body having a tunnel formation substantially centrally disposed and extending from end to end forming troughs in its lower portion, the tank-like body having a single compartment above the troughs, a bulk head construction arranged to close off a compartment at one end of the body to vary the load distribution on the ground-engaging wheels, the bulk head construction comprising fixed bulk head plates in the troughs, bulk head door means in the space above the troughs arranged to be opened and closed and cooperating with the bulk head plates to separate a compartment at said end of the body from the remaining portion thereof, propelling means on the bottom of each trough for discharging the granular material, said fixed bulk head plates having their lower edges disposed clear of the propelling means.

JAMES G. WINSOR.